United States Patent
Stuck et al.

(10) Patent No.: US 7,864,424 B2
(45) Date of Patent: Jan. 4, 2011

(54) ZERO ORDER PIGMENTS (ZOP)

(75) Inventors: Alexander Stuck, Wettingen (CH); Harald Walter, Kilchberg (CH)

(73) Assignee: CSEM Centre Suisse d'Electronique et de Microtechnique SA-Recherche et Développement, Neuchâtel (CH)

(*) Notice: Subject to any disclaimer, the term of this patent is extended or adjusted under 35 U.S.C. 154(b) by 318 days.

(21) Appl. No.: 11/806,351

(22) Filed: May 31, 2007

(65) Prior Publication Data

US 2007/0285782 A1 Dec. 13, 2007

Related U.S. Application Data

(60) Provisional application No. 60/809,417, filed on May 31, 2006.

(51) Int. Cl.
*G02B 15/08* (2006.01)
(52) U.S. Cl. ........................ 359/569; 359/566
(58) Field of Classification Search .......... 359/558–576
See application file for complete search history.

(56) References Cited

U.S. PATENT DOCUMENTS

| | | | | |
|---|---|---|---|---|
| 4,484,797 A | 11/1984 | Knop et al. | ................. | 350/162 |
| 5,135,812 A | 8/1992 | Phillips et al. | .............. | 428/403 |
| 6,043,936 A | * 3/2000 | Large | ......................... | 359/572 |
| 6,749,777 B2 | 6/2004 | Argoitia et al. | ............. | 252/582 |

FOREIGN PATENT DOCUMENTS

| WO | WO03/102084 A1 | 12/2003 |
|---|---|---|
| WO | WO 2004/024836 | * 3/2004 |

OTHER PUBLICATIONS

Gale, M.T. et al, "Zero-Order Diffractive Microstructures For Security Applications," SPIE vol. 1210, Optical Security and Anticounterfeiting Systems (1990), pp. 83-89.

* cited by examiner

*Primary Examiner*—Joshua L Pritchett
(74) *Attorney, Agent, or Firm*—Steptoe & Johnson LLP

(57) ABSTRACT

One or more zero-order diffractive pigments (ZOP) having both a particle distribution matrix material, and a layer of material in or on such a matrix material and having an index of refraction higher than that of the matrix material, and having a diffractive grating structure with a period in the range of 100 to 600 nm, which is smaller than the wavelength of light reflectable thereby in the zeroth reflection order. In such ZOPs the index of refraction of the matrix material is usually at least 0.25 less than that of the material of the layer, and the layer is typically of a thickness between 30 and 500 nm.

15 Claims, 9 Drawing Sheets

ZERO ORDER PIGMENTS (ZOP)

CROSS-REFERENCE TO RELATED APPLICATIONS

This application claims the benefit of our U.S. Provisional Patent Application Ser. No. 60/809,417, filed May 31, 2006, the entire disclosure of which is hereby incorporated by reference herein.

BACKGROUND

Physical color is usually obtained either by diffraction of a surface grating, where first and higher diffraction orders such as in a hologram create color, as in U.S. Pat. No. 6,749,777, or by flat dielectric stacks such as interference filters. Under certain conditions strong colors are also obtained by combining very fine, sub-wavelength gratings, with one or several dielectric and/or metal stacks thereon. Such a zero order device (ZOD) uses zero order diffraction to produce very pronounced color effects.

Advantages of ZOD technology are: an iridescent optical effect, which varies with tilting angle $\Theta$ and/or rotation angle $\phi$; optical effects easily recognized by untrained people; effects are machine readable; even under diffuse lighting conditions, strong color effects are achieved; this is a cost effective, mass producible technique; it is very difficult to counterfeit because the effect depends on the material properties. The deposition of high index material is on two different levels combined with an extremely fine, sub-wavelength grating. Copying only the grating or the material stack will not produce the desired effect.

BRIEF SUMMARY OF THE INVENTION

Advantages of the ZOD technology are achieved by the invention disclosed and claimed herein, including one or more zero-order diffractive pigment(s) (ZOP) having both a particle distribution matrix material, and a layer of material in or on such a matrix and having an index of refraction higher than that of the matrix material, and having a diffractive grating structure with a period in the range of 100 to 600 nm, which is smaller than the wavelength of light reflectable thereby in the zeroth reflection order. In such ZOPs, the index of refraction of the matrix material is usually at least 0.25 less than that of the material of the layer, and the layer is typically of a thickness of between 30 and 500 nm.

DETAILED DESCRIPTION

Figure 1:
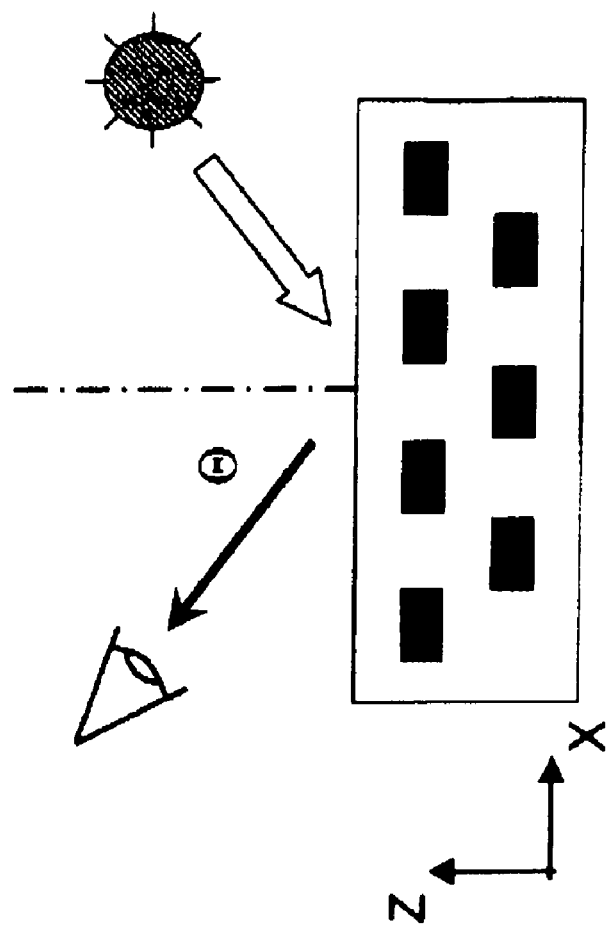
FIG. 1 is a schematic side view of a simple ZOD structure.

As is shown in FIG. 1, a typical ZOD structure comprises a low index of refraction material (white, $n1 \approx 1.1-1.7$) in which segments of a material with a higher index of refraction ($n2 > n1+0.25$) are regularly arranged on a grating, i.e., an HRI layer. FIG. 1 is a schematic side view of a simple ZOD structure, wherein the sun symbol represents illumination by white light, and the arrow represents the reflected color. If illuminated by white light, this ZOD structure directly and very efficiently reflects a particular spectral range or color. This is as a result of a resonance effect in the sub-wavelength grating structured wave-guiding HRI layer. This layer acts as a leaky waveguide. Therefore ZODs are sometimes called resonant gratings. The remainder of the incident light is transmitted.

Figure 2:
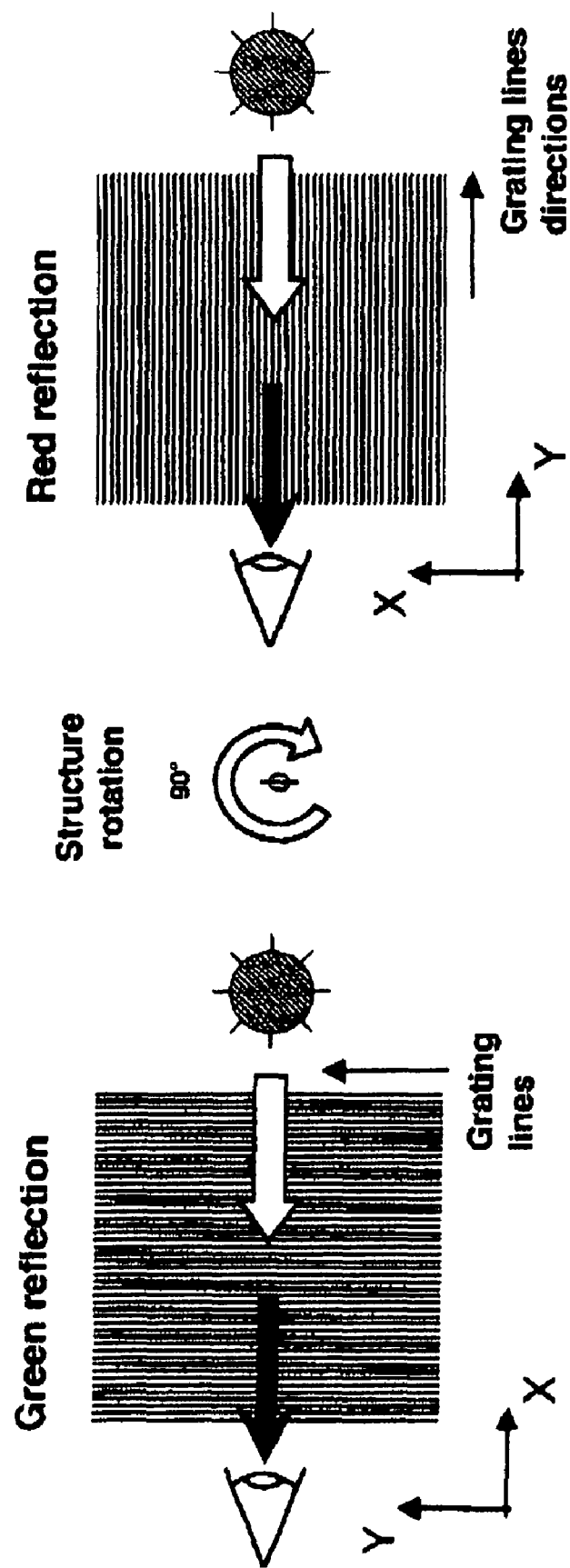
FIG. 2 is a schematic top view showing different "color flip" effects of rotation of a ZOD structure about a surface normal axis, that is an axis normal to a surface.

The reflected and transmitted color depends on the orientation of the grating with respect to an observer. As indicated in FIG. 2, the color also changes upon rotation about an axis normal to the surface, an effect we call color flip. FIG. 2 schematically shows a ZOD effect, a color flip upon rotation about an axis normal to the surface of a linear grating. Green color is reflected if the grating lines are perpendicular to the direction of reflection. Rotating the ZOD device by 90° about that axis turns green to red. The grating lines are then in line with the direction of reflection. Other grating symmetries occur at other rotational angles. Depending on the symmetry of the grating, different rotation angles can be achieved. In linear gratings, the spectra are identical, if the ZOD is rotated by 180°, but a strong color flip occurs upon 90° rotation. In two-dimensional gratings, 60° and 90° symmetric color flip effects can be easily caused, and other values are also possible. Reflectivities of 100% at specific wavelengths are theoretically possible. In practice lower values up to 80-90% are observed.

Figure 3A:
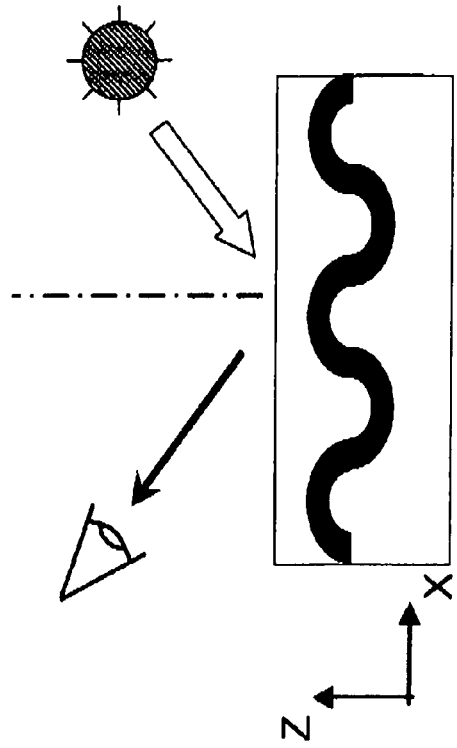
FIG. 3a) is a schematic side view of an individual ZOD-pigment grating.
Figure 3B:
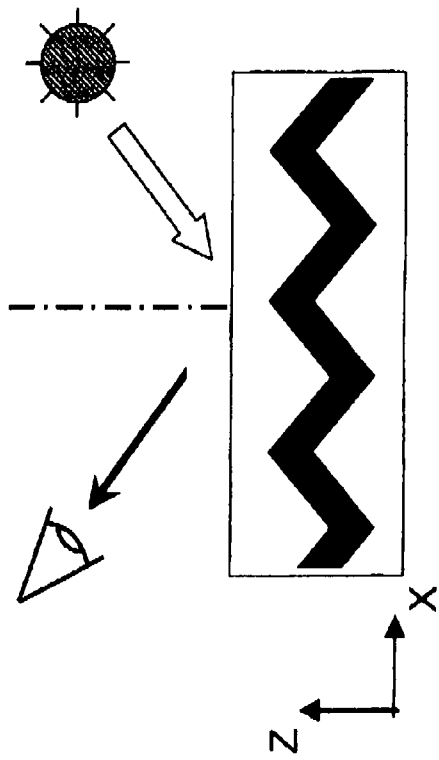
FIG. 3(b) is a schematic side view of a triangular or zig-zag ZOD-pigment grating
Figure 4A:
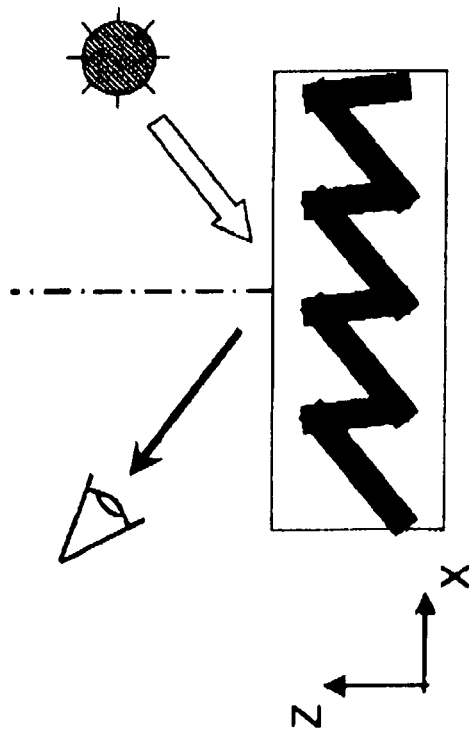
FIG. 4(a) is a schematic side view of an asymmetric triangular ZOD-pigment grating.
Figure 4B:
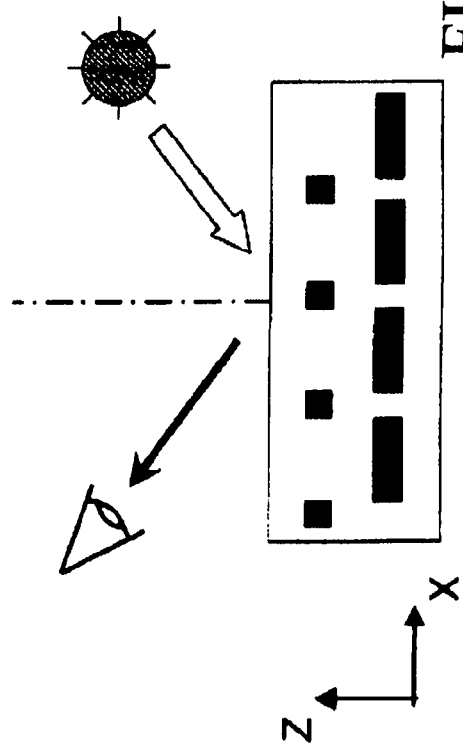
FIG. 4(b) is a schematic side view of another asymmetric, rectangular ZOD-pigment grating.

For zero order diffraction to take place, the periodicity of the grating has to be smaller than the wavelength of the diffracted light. Typical grating periods are in the range between 100 nm and 600 nm. Typical grating depths are between 30 nm and 300 nm, preferably 150 nm or less. For dielectric materials, the useful thickness strongly depends on the grating structure and its material properties. Typical thicknesses are in the range of 30 nm-250 nm. The grating profile also affects the reflection spectrum. Possible grating shape or unit cross-sectional profiles are rectangular, sinusoidal, triangular and combinations of these three basic shapes. Two additional basic grating shapes are shown in FIG. 3. FIG. 3 schematically illustrates alternative ZOD-pigment grating shapes such as FIG. 3(a) sinusoidal, and FIG. 3(b) triangular. Combinations of these two shapes and combinations with rectangular shapes also exhibit zero-order diffraction. FIG. 4 schematically illustrates asymmetric ZOD-pigment grating shapes such as FIG. 4(a) asymmetric triangular, and FIG. 4(b) asymmetric rectangular.

Presently ZOD's are manufactured only as laminated foils in roll-to-roll processes with thermally evaporated ZnS as the HRI layer. These foils are currently used as novel security features for passport and document protection, as well as in banknotes. ZOD's are a natural successor of the now widely used holograms for security applications because they are much more difficult to counterfeit, yet use the same basic hologram production technologies. They are more readily visible to the human eye and can be easily checked with simple machines.

Although ZOD effects on large areas (>2 mm$^2$) have been known since 1984 (U.S. Pat. No. 4,484,797), to date the size effect of ZOD has not been investigated. The knowledge that ZOD effects readily appear if the grating extends laterally over at least three grating periods is new. The calculations and experiments involved are difficult. Not only large area ZOD color effects are possible, but color pigments based on zero-order diffraction, with lateral sizes of one micrometer or larger can be manufactured. The reflection spectrum of such color pigments depends, or is additive to, the above mentioned parameters, the size and shape of the pigment. Pigments with a grating period of 500 nm or less and a lateral size of between 1 and 2 micrometers, have broader reflection peaks than pigments with the same grating period but a lateral size of 10 micrometers or more. ZOD pigments have a thickness of 100 nm's to 5 microns, and a lateral size of at least 1 micrometer to a maximum of 500 micrometers. The shape of such pigments can be arbitrary, but preferred shapes are rectangular, triangular, hexagonal, or pentagonal.

ZOD's with linear, one dimensional gratings show a distinct color flip under 90° rotation about an axis normal to the surface. And ZOD's in general change color at different polar angles. This gives ZOD pigments an iridescent appearance when applied to a surface, similar to the color shifting effects observed with the well established color shifting interference pigments (see U.S. Pat. No. 5,135,812). In pigments deposited with an arbitrary orientation the color flip is not observable by the human eye. Only the dependence on the polar angle θ will remain. However, if the pigment shape is strongly anisotropic, for example, rectangular and the deposition method favors the alignment in one direction, then the deposited color pigments will still show a color flip effect, i.e., the surface will change color when it is rotated about an axis normal to the surface. This can be achieved by, for example, making long, narrow, rectangular pigments and depositing them in a wet coating process with or without a polymeric binder. Printing, especially flexo-printing, ink jet-printing or screen-printing, curtain or dip coating, and spraying are suitable techniques. The dried layer should be at maximum a few microns thick (less than two times the longer dimension of the pigment side).

It is also possible to incorporate magnetic layers into the ZOD pigments, magnetize them in one direction during manufacturing, and align the pigments magnetically during deposition. Such a magnetic layer could be made of, for example, chromium oxide, metallic iron, iron oxide, metallic Ni and the like. The deposition of magnetized pigments permits magnetically writing an optical pattern in the visible, UV and IR regions, by locally changing the magnetic field during printing of the pigments. No other known optical technique has this capability. Such magnetic ZOD pigments can be used to measure the spatial distribution of magnetic fields with high resolution and a simple color camera.

In its most simple embodiment a ZOD color pigment comprises a grating structured HRI layer floating in a lacquer, a liquid, paste, polymer, powder or other particle distribution matrix. The dried matrix should possess an average optical index of refraction at least 0.25 lower than the refractive index of the HRI layer.

Figure 5:
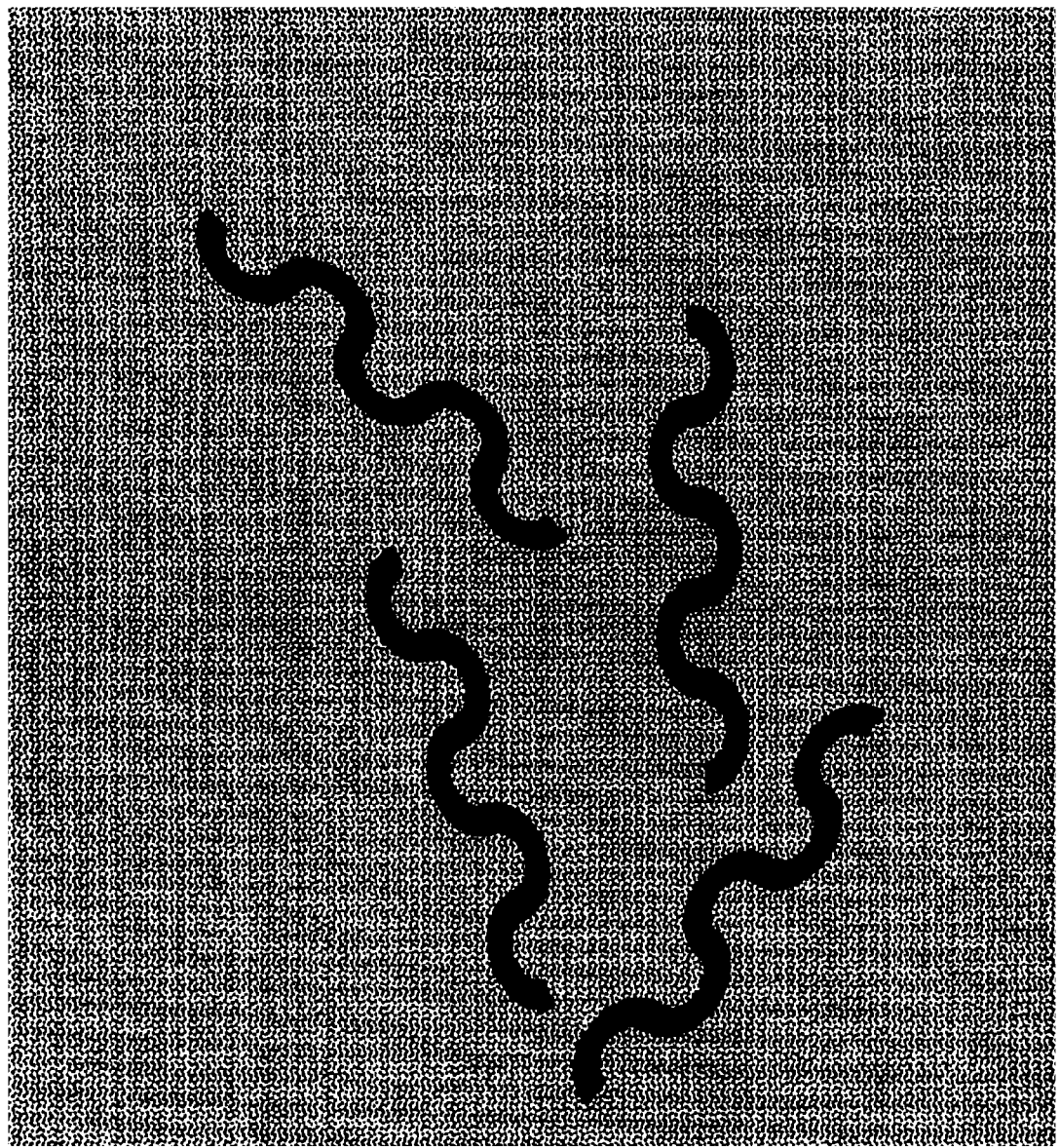
FIG. 5 is a schematic representation of ZOD pigments embedded in a host matrix.

For example, the HRI layer can be made of ZnS, TiO$_2$, Cr$_2$O$_3$, AlN, Al$_2$O$_3$, HfO$_2$, Nb$_2$O$_5$, Si$_3$N$_4$, SnN, Ta$_2$O$_5$, V$_2$O$_5$, WO$_3$, or ZrO$_2$, or similar inorganic materials or high-index polymers like HRI721 and HRI751 (optimate) floating in a solvent or an organic matrix, as shown in FIG. 5. Another possibility is that the HRI layer, made of TiO$_2$ or similar edible materials is embedded in a digestible powder. Such a powder could be a mass mixture of a pharmaceutical pill, foods, organic food, sunscreen, toothpaste, color coatings for automobiles, plastics, metals, paper and similar materials. A typical example of a pharmaceutical composition used in pills is shown in Table I:

TABLE 1

Example of a pharmaceutical pill mass mixture

| Fraction | Ingredients |
|---|---|
| 72.75% | Lactose Monohydrate |
| 24.25% | Microcrystalline Cellulose |
| 1.00% | Aerosil (colloidal silica, anhydrous) |
| 1.00% | Magnesium-stearate (Mg-stearate) |
| 1.00% | Na-salicylate (exemplary active agent) |

Figure 6:
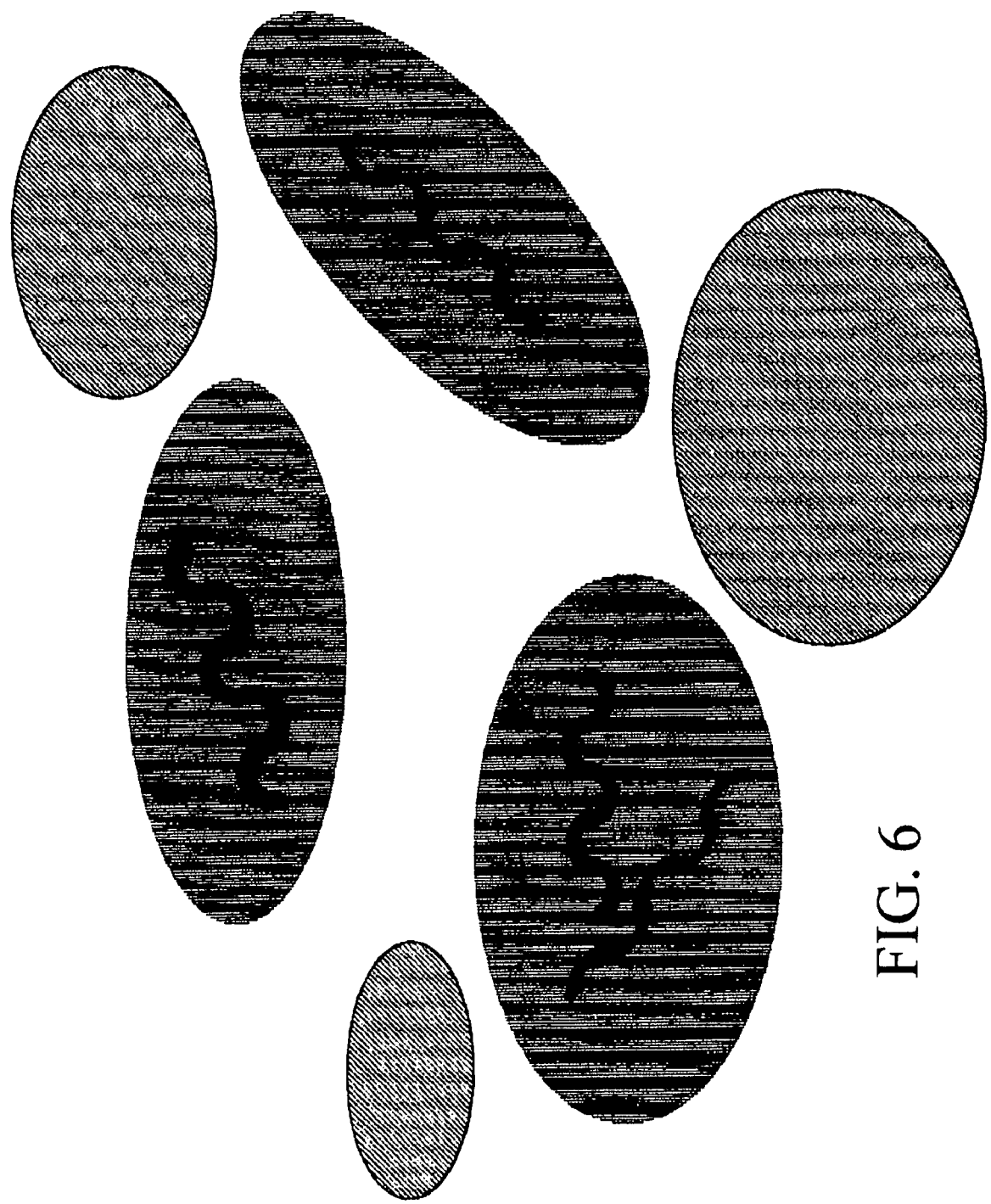
FIG. 6 is a schematic representation of various ZOD-pigments embedded in small particles of a host matrix, which are mixed with other particles.

A third possibility is that one or several HRI pigments are coated with an organic, or inorganic droplet and are fixed within this droplet. As shown in FIG. 6, these droplets are then used as fillers in a powder, paste or gel, or also incorporated in liquid or plastic. For pharmaceutical applications or applications in the food industry, the pigments might be coated with or embedded in sugars.

Figure 7:
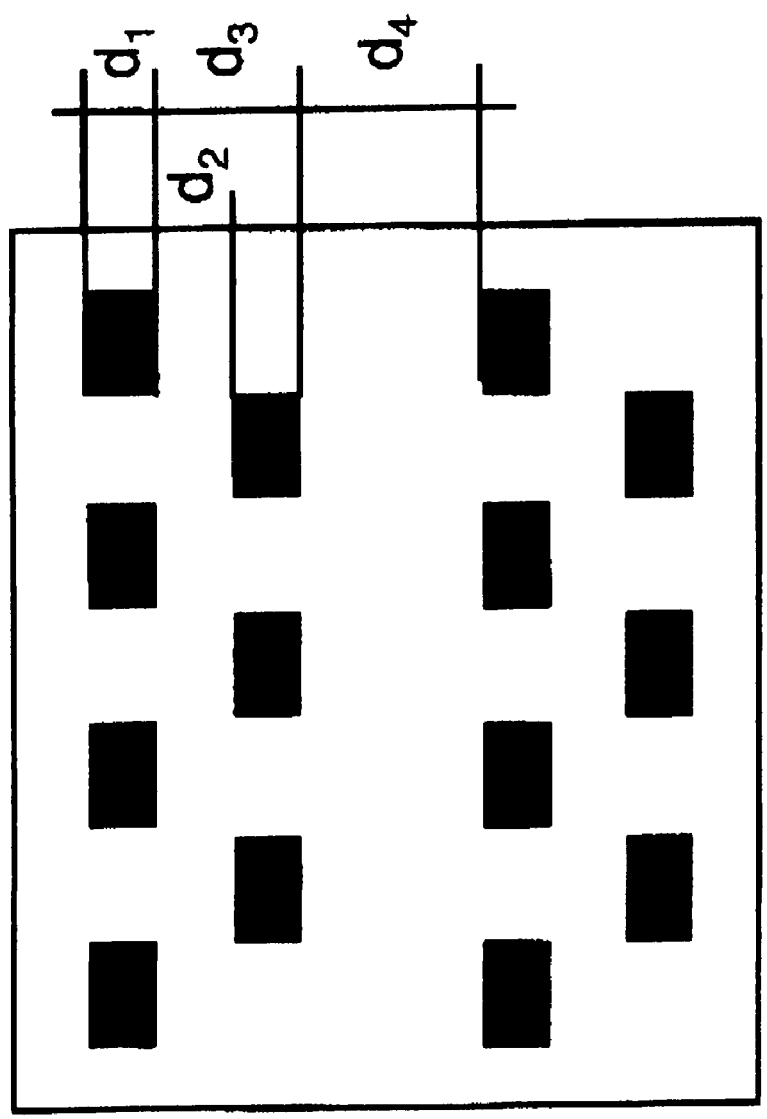
FIG. 7 is a schematic side view of an exemplary multi-layer ZOD pigment structure.

Other highly effective embodiments of ZOD's are multi-level systems, i.e. several (two or more) dielectric layers or strata on top of a subwavelength grating or combinations of zero-order effects with metallic layers or combinations of both. One possibility is to add similar or identical ZOD's on top of each other. This will enhance the colors, because light that is transmitted by one ZOD layer is partially reflected by the layer underneath, therefore increasing total reflectivity. In such an arrangement novel spectra appear if the separation between the dielectric layers is smaller than about 1 micron. In this case each dielectric layer does not act as an independent ZOD, but the layers will mutually interfere to give stronger and different color spectra. FIG. 7 schematically illustrates an example of a possible multilayer ZOD pigment structure. In this case, the lateral dimension of the pigment is about 4 grating periods. The distances $d_1$-$d_4$ are smaller than 1 micrometer, typically 500 nm or less, permitting mutual optical interference between the layers.

Figure 8:
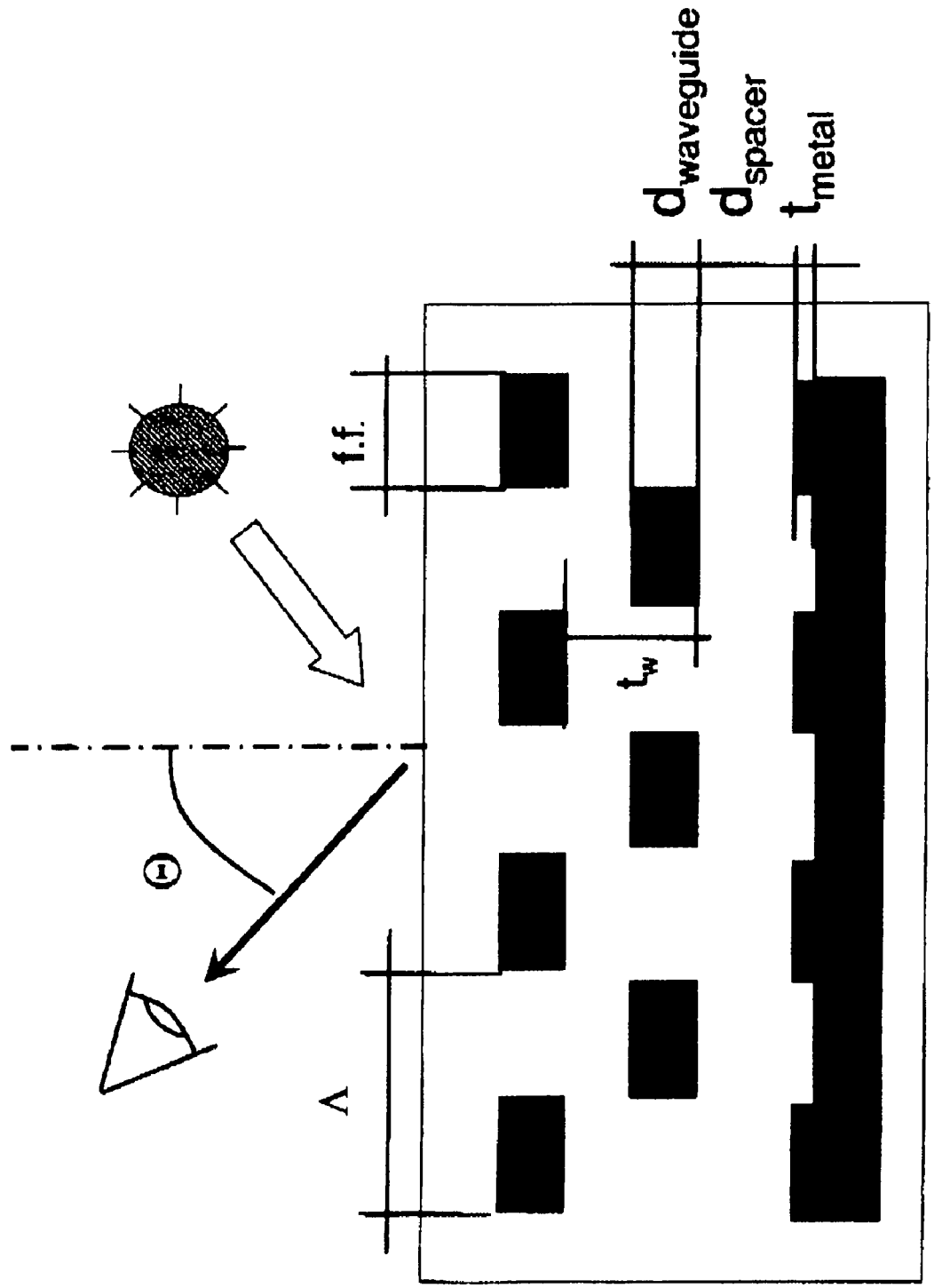
FIG. 8 is a schematic side view of an exemplary multi-ZOD structure.

Another possibility to make complex ZOD pigments is to combine zero-order diffractive structures with metallic or dielectric mirror structures. For example the stack on the grating might contain one or several, fully reflective or semi-transparent metallic layers, 5 to 500 nm thick of Al, Ag, Au, Cr, Cu, and their alloys, or similar metals. Here strong colors will be observed if the mirror is placed close to the HRI layer, i.e. if the thickness of each single layer is less than 1 micron. As shown in FIG. 8, the color is due to additional interference between the mirror and the conventional ZOD pigment structure. FIG. 8 schematically illustrates an example of a possible mirror-ZOD pigment structure, wherein the lateral pigment dimension is 4 grating periods. The black bottom is the reflecting mirror structure, which might be corrugated. Typical inter-layer distances are smaller than 1 micrometer, typically 500 nm or less, permitting mutual optical interference between all layers.

Because the color effect of the ZOD pigments can be size dependent, close control of the pigment shape is needed for reproducible results and narrow color spectra. The shape of color pigments is controlled at the stage where the grating is manufactured.

A typical manufacturing process of a ZOD pigment will have the following steps:

A grating is hot- or cold embossed into a deformable polymer foil or deformable layer on a carrier foil. Examples of such polymer foils are polycarbonate or any other suitable thermoplastic polymer. Suitable materials for the polymeric layer are polyvinyl alcohol (PVA), polyvinyl pyrollidone (PVP) and other suitable thermoplastic and coatable polymers. The carrier foil can be made of acrylonitrile butadiene styrene (ABS), polycarbonate (PC), polyethylene (PE), polyetherimide (PEI), polyetherketone (PEK), polyethylene naphthalate (PEN), polyethylene therephtalate (PET), polyimide (PI), polymethyl methacrylate (PMMA), poly-oxymethylene (POM), mono-oriented polypropylene (MOPP), polystyrene (PS), polyvinyl chloride (PVC) and the like.

The grating master can be metallic, for example a Ni or Steel foil, sheet, plate or roll, with or without Cr surface finish. It might also be made of MoC or WC, and the like. The master has small grating patches with borders, which are in the shape of the pigments. The edges of the gratings are either enhanced or depressed sufficiently so that each grating on the master is well separated. The intermediate region functions as a means to separate the pigments. If needed a release layer can be deposited on the embossable foil or layer or the mastering tool. This release layer later functions as an anti-adhesion layer for the HRI layer. Possible examples of release layers are Teflon, DLC, silanes and the like.

Deposition of at least one high index layer is typically carried out by thermal evaporation, plasma deposition, sputtering, or gravure printing. Several stacks of alternating high and low index layers might be deposited. The thickness of each layer is less than 1 micrometer, typically between 50 nm and 500 nm. Thin metal layers might also be deposited by thermal evaporation, plasma deposition or sputtering. The thickness of these layers is typically in the range of 5 nm to 150 nm.

As small grating regions are separated by the knife edge, the pigments can be peeled off mechanically while dissolving the embossing layer, and dissolving the pigments in a liquid after the deposition. Pigments can be selected for size and shape, to further narrow the size distribution. Several sizes can be manufactured at once with this technique.

The HRI-pigments are then embedded in paste, powder or distributed in a liquid or paste to be in a processable form.

Figure 9:
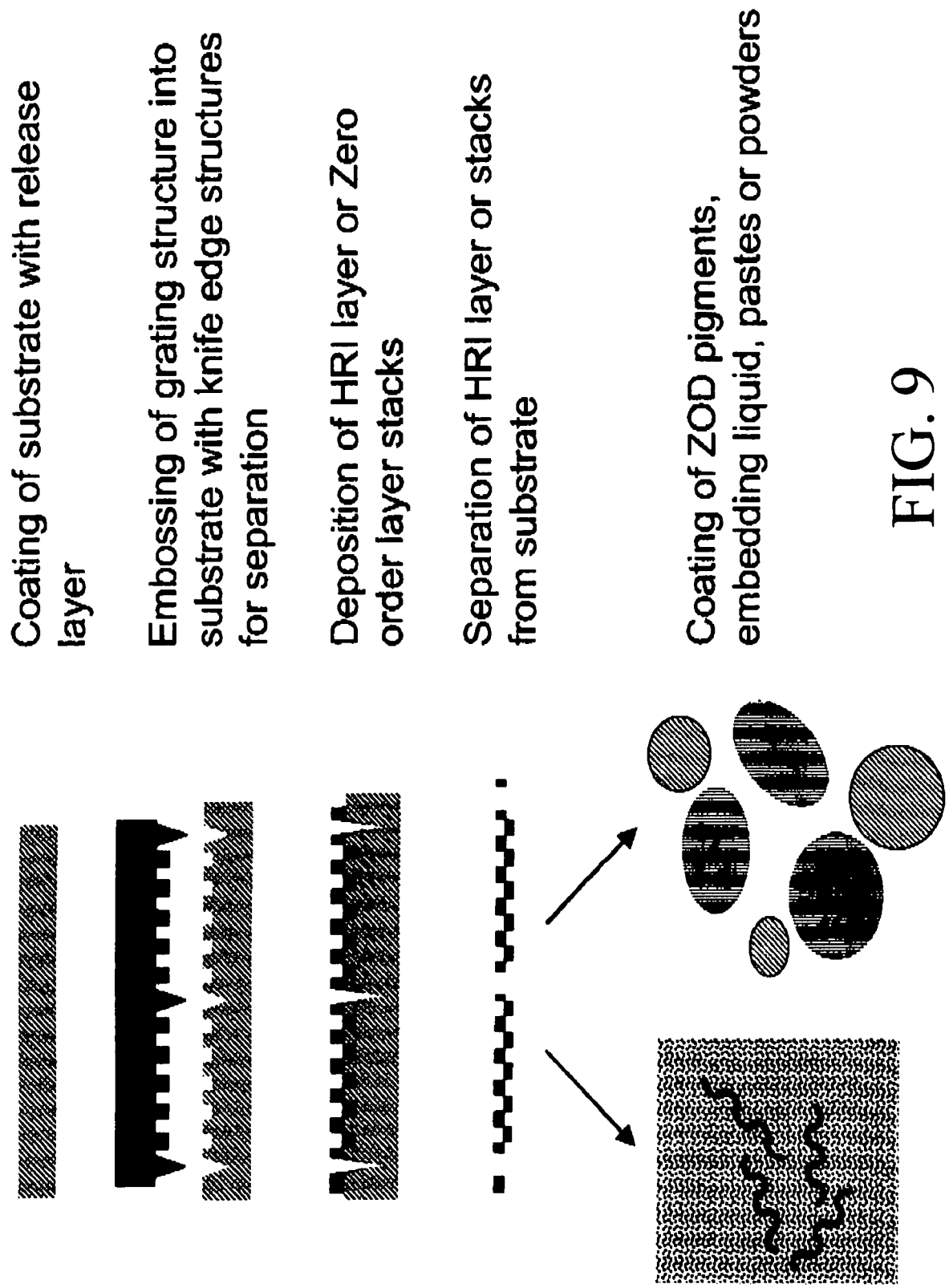
FIG. 9 is a schematic illustration of basic steps for manufacturing ZOD color pigments.

FIG. 9 schematically illustrates basic manufacturing steps for ZOD color pigments. It is possible to arrange the first three steps (a)-(c) in different orders. The geometry of the knife separators during embossing can be different, for example, rectangular. Also a depression instead of a protrusion may provide the separator function. However, the height of the knife edge is larger than the full thickness of the dielectric stack.

What is claimed is:

1. A zero-order diffractive pigment (ZOP), comprising:
   a particle distribution matrix material, and
   a wave-guiding high-refractive index (HRI) layer of material contiguously adjacent said matrix material, having an index of refraction at least 0.25 higher than that of said matrix material, a thickness between 30 nm and 500 nm, a zero-order diffractive sub-wavelength grating structure with a period in the range of 100 nm to 600 nm, and grating depth between 30 nm and 300 nm.

2. The ZOP of claim 1, wherein the lateral size of the pigments is in the range of 1 micrometer to 500 micrometer.

3. The ZOP of claim 1, wherein the index of refraction of said matrix material is in the range of 1.1 to 1.7.

4. The ZOP of claim 1, wherein the grating depth is not more than 150 nm.

5. The ZOP of claim 1, additionally comprising a magnetic layer.

6. The ZOP of claim 1, wherein the matrix material is animal- or human-digestible.

7. The ZOP of claim 1, wherein the layer comprises a plurality of such materials.

8. The ZOP of claim 1, wherein the grating extends laterally for a length of at least three times the period of the grating.

9. The ZOP of claim 1, which are relatively long, narrow, and of rectangular cross-section.

10. The ZOP of claim 1, additionally comprising a plurality of dielectric strata on the grating.

11. The ZOP of claim 1, additionally comprising at least one metallic strata on the grating.

12. The ZOP of claim 1, comprising a plurality of said layers spaced apart from each other.

13. The ZOP of claim 12, wherein the spacing distances between layers permits optical interference between said layers.

14. Particles comprising at least one of the ZOPs of claim 1 coated with and fixed within a coating material.

15. A mixture of particles of claim 14, with another solid or liquid material.

* * * * *